(12) United States Patent
Werner et al.

(10) Patent No.: US 6,372,705 B1
(45) Date of Patent: Apr. 16, 2002

(54) AZEOTROPIC COMPOSITIONS OF PERFLUOROHEXANE AND HYDROCARBONS HAVING 5 CARBON ATOMS AND THE USE THEREOF IN THE PRODUCTION OF FOAMS

(75) Inventors: Joachim Werner, Bethel Park, PA (US); Scott A. Kane, Wellsburg, WV (US); Herman P. Doerge, Pittsburgh; Eric F. Boonstra, Oakdale, both of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 08/410,247

(22) Filed: Mar. 24, 1995

(51) Int. Cl.$^7$ .............................. C11D 7/26; C11D 7/60; C23G 5/024; C23G 5/028

(52) U.S. Cl. ...................... 510/411; 510/177; 510/408; 264/53; 521/98; 521/131

(58) Field of Search ................................ 252/162, 172, 252/DIG. 9; 264/53, DIG. 5; 521/98, 131; 510/177, 408, 411

(56) References Cited

U.S. PATENT DOCUMENTS

| | | | | |
|---|---|---|---|---|
| 3,887,629 A | * | 6/1975 | Fozzard ...................... 260/653 |
| 4,055,507 A | | 10/1977 | Dastur et al. ................ 252/162 |
| 4,076,644 A | | 2/1978 | Burt et al. .................... 252/162 |
| 4,828,751 A | | 5/1989 | Kremer ........................ 252/171 |
| 4,898,893 A | | 2/1990 | Ashida ......................... 521/131 |
| 4,900,365 A | | 2/1990 | Lund et al. .................... 134/12 |
| 4,960,804 A | | 10/1990 | Doerge ......................... 521/130 |
| 4,972,002 A | | 11/1990 | Volkert ........................ 521/120 |
| 5,035,833 A | | 7/1991 | Ogawa et al. .......... 252/182.24 |
| 5,096,933 A | | 3/1992 | Volkert ........................ 521/131 |
| 5,106,527 A | | 4/1992 | Doerge et al. ............... 252/172 |
| 5,166,182 A | | 11/1992 | Blanpied ...................... 521/50 |
| 5,227,088 A | | 7/1993 | Swan et al. .................. 252/172 |
| 5,250,579 A | * | 10/1993 | Smits et al. .................... 521/98 |
| 5,283,003 A | | 2/1994 | Chen ............................ 252/350 |
| 5,286,759 A | * | 2/1994 | Smits et al. ................... 521/131 |
| 5,290,823 A | | 3/1994 | Volkert ........................ 521/131 |
| 5,302,212 A | | 4/1994 | Desbiendras et al. .......... 134/40 |
| 5,318,996 A | | 6/1994 | Yu-Hallada et al. ......... 521/131 |
| 5,401,429 A | * | 3/1995 | Flynn et al. ................. 252/171 |
| 5,403,514 A | * | 4/1995 | Matsuhisa et al. ........... 252/364 |
| 5,431,837 A | * | 7/1995 | Matsuhisa et al. ........... 252/171 |

FOREIGN PATENT DOCUMENTS

| | | | |
|---|---|---|---|
| EP | 439283 | * | 7/1991 |
| EP | 465037 | * | 1/1992 |
| JP | 1141995 | | 6/1989 |
| JP | 1141996 | | 6/1989 |
| JP | 6-220490 | * | 8/1994 |

OTHER PUBLICATIONS

Lamberts, 1,1,1,4,4,4 Hexafluorobutane, a New Non–Ozone–Depleting Blowing Agent for Rigid PUR Foams, Polyurethanes World Congress Sep. 24, 26, 1991, pp. 734–739.

Hicks et al, *Australian Journal of Chemistry*, vol. 31 No. 1 pp 19–25 Jan. 1978.*

Huff et al, *J. Chem. Eng. Data*, vol. 8, pp. 306–311, 1963. No month available.*

Siebert et al, *J. Phys. Chem.* vol. 75, No. 25, pp. 3863–3870, 1971. No month available.*

McLure et al, Nature Physical Science, vol. 241, p. 71 Jan. 1973.*

* cited by examiner

*Primary Examiner*—Mark Kopec
*Assistant Examiner*—Brian P. Mruk
(74) *Attorney, Agent, or Firm*—Joseph C. Gil; Lyndanne M. Whalen

(57) ABSTRACT

Azeotropic compositions made up of (a) from about 26 to about 72% by weight perfluorohexane and (b) one compound selected from (1) about 36 to about 74% by weight 2-methyl butane or (2) about 28 to about 53% by weight n-pentane in which the sum of the weight percent (a) and weight percent (b) is 100 percent may be used as blowing agents in the production of polyurethane/polyurea foams.

1 Claim, 2 Drawing Sheets

AZEOTROPIC COMPOSITIONS OF PERFLUOROHEXANE AND HYDROCARBONS HAVING 5 CARBON ATOMS AND THE USE THEREOF IN THE PRODUCTION OF FOAMS

BACKGROUND OF THE INVENTION

The present invention relates to novel azeotropic compositions, a process for the production of foams in which these azeotropic compositions are used and to foams produced using these azeotropic compositions.

The use of trichloromonofluoromethane (CFC-11) and other chlorofluorocarbons as blowing agents in the production of urethane foams is well known. These CFC blowing agents are also known to have an adverse effect upon the ozone layer in the atmosphere. The urethane foam industry is therefore investigating methods for producing foams with good physical properties without using CFC blowing agents.

Initially, the most promising alternatives appeared to be hydrogen-containing chlorofluorocarbons (HCFCs). U.S. Pat. No. 4,076,644 for example, discloses the use of 1,1-dichloro-2,2,2-trifluoroethane (HCFC-123) and 1,1-dichloro-1-fluoroethane (HCFC-141b) as blowing agents for the production of polyurethane foams. However, HCFCs also have some ozone-depletion potential. There is therefore mounting pressure to find substitutes for the HCFCs as well as the CFCs.

Alternative blowing agents which are currently considered promising because they contain no ozone-depleting chlorine are fluorocarbons (FCs) and partially fluorinated hydrocarbons (HFCs). The use of 1,1,1,4,4,4-hexafluorobutane as a blowing agent is disclosed in Lamberts, "1,1,1,4,4,4-hexafluorobutane, a New Non-Ozone-Depleting Blowing Agent for Rigid PUR Foams", *Polyurethanes World Congress* 1991 (September 24–26), pages 734–739. U.S. Pat. No. 4,972,002 teaches that low boiling fluorinated compounds such as fluorinated hydrocarbons, perfluorinated hydrocarbons, sulfur hexafluoride and mixtures thereof are useful as blowing agents for the production of polyisocyanate polyaddition foam products.

U.S. Pat. No. 4,898,893 teaches that a blend of a liquid hydrocarbon and halogenated hydrocarbon is useful as a blowing agent for the production of isocyanurate foams.

The use of mixtures of a chlorofluorocarbon having a boiling point between 74 and 120° F. and an alkyl alkanoate having a molecular weight of no more than 88 as a blowing agent for foams is disclosed in U.S. Pat. No. 4,960,804. HCFC-123 and HCFC-141b are among the chlorofluorocarbons disclosed therein.

U.S. Pat. No. 5,035,833 discloses the use of a mixture of dichlorotrifluoroethane and at least one paraffin having 5 or 6 carbon atoms as blowing agents useful for the production of rigid polyurethane foams.

U.S. Pat. No. 5,096,933 discloses a process for the production of rigid polyurethane foams in which cyclopentane, cyclohexane or cyclopentane and cyclohexane, optionally in combination with a low boiling compound (i.e., boiling point less than 35° C.) having no more than 4 carbon atoms which is homogeneously miscible with cyclopentane and/or cyclohexane is used.

U.S. Pat. No. 5,290,823 teaches the production of rigid polyurethane foams using a blowing agent mixture which includes highly fluorinated or perfluorinated organic compounds, cyclopentane and optionally other aliphatic or cycloaliphatic hydrocarbons having 4 to 8 carbon atoms.

U.S. Pat. No. 5,318,996 discloses the production of rigid polyurethane foams with a mixture of blowing agents which mixture includes water, HCFC-22 or HCFC-141b and a perfluorinated hydrocarbon having from 4 to 8 carbon atoms.

Mixtures and azeotropes of HCFCs and various compounds and azeotropes of organic compounds which may be used in combination with HCFCs have also been described in the prior art as being useful blowing agents for the production of foams.

U.S. Pat. No. 4,828,751 teaches solvent compositions for cleaning silicon wafers which solvent compositions include a perhalogenated haloalkylhydrocarbon containing from 5 to 12 carbon atoms and a partially fluorinated alcohol.

U.S. Pat. No. 4,900,365, for example, teaches that azeotropes of a dichlorotrifluoroethane and isopentane are useful in the production of polyurethane foams.

U.S. Pat. No. 5,106,527 discloses the use of azeotropes of 2-methyl butane and 1,1-dichloro-1-fluoroethane as blowing agents for the production of rigid, closed cell foams.

The azeotropic mixtures taught in U.S. Pat. No. 5,166,182 must have boiling points below 50° C. These azeotropic mixtures are formed from organic compounds having surface active properties that enable the blended azeotropic mixture to become miscible with polymer resins. Examples of the organic compounds described as being useful in the production of such azeotropes include: n-pentane, acetone, methyl alcohol, methyl formate, ethyl formate, ethyl alcohol, 2-methyl butane, nitromethane, cyclopentane, 2,3-dimethyl butane, 2,2-dimethyl butane and dimethyl sulfide. These azeotropes may be used in combination with fluorocarbons but an azeotrope in which a fluorocarbon is one of the components is not taught or suggested.

U.S. Pat. No. 5,227,088 discloses azeotrope-like compositions which are made up of 1-chloro-3,3,3-trifluoropropane and a hydrocarbon containing five or six carbon atoms.

U.S. Pat. No. 5,283,003 discloses a blowing agent which is made up of at least one five-carbon member hydrocarbon, a chlorinated alkane and methyl formate. Methylene chloride is the preferred chlorinated alkane.

Azeotropic mixtures in which HCFCs are included are also known to be useful as cleaning solvents. U.S. Pat. No. 4,055,507, for example, discloses an azeotropic mixture of 1,2-dichloro-1,1-difluoroethane and 3-methylpentane which is taught to be useful as such a solvent. U.S. Pat. No. 5,302,212 teaches that an azeotrope of (perfluoroalkyl) ethylene and methanol may be used to clean a solid surface. Japanese 1,141,995 discloses an azeotropic mixture of 67 to 87% by weight of HCFC-123 and 13 to 33% by weight of 2-methyl butane which is useful as a cleaning solvent. Japanese 1,141,996 discloses an azeotropic mixture of HCFC-141b and n-pentane or 2-methyl butane or 2,2-dimethyl butane which is also taught to be useful as a cleaning solvent.

The use of azeotropes formed from perfluorohexane and a hydrocarbon having 5 carbon atoms as a blowing agent or a cleaning solvent has not, however, been described in the prior art.

SUMMARY OF THE INVENTION

It is an object of the present invention to provide novel azeotropic compositions.

It is a further object of the present invention to provide an azeotropic composition which contains no chlorine and therefore has an ozone depletion potential of zero.

It is also an object of the present invention to provide a process for the production of urethane foams in which no chlorine-containing blowing agent is employed.

It is another object of the present invention to provide polyurethane foams having good physical properties which foams are produced without the use of a chlorine containing blowing agent.

These and other objects which will be apparent to those skilled in the art are accomplished with the azeotropic compositions of the present invention. These azeotropic compositions are made up of (a) perfluoro-hexane and (b) one compound selected from (1) about 36 to about 74% by weight 2-methyl butane (i.e., from about 73 to about 93 mole %) or (2) about 28 to about 53% by weight (from about 65 to about 84 mole %) n-pentane, in which the sum of the weight percent of (a) and weight percent of (b), and the sum of the mole percent of (a) and mol percent of (b), respectively, is approximately 100 percent. These azeotropic compositions are included in a foam-forming mixture which includes an isocyanate and isocyanate-reactive material. The foams made with these azeotropic compositions are characterized by good physical properties.

DETAILED DESCRIPTION OF THE INVENTION

Figure 1:
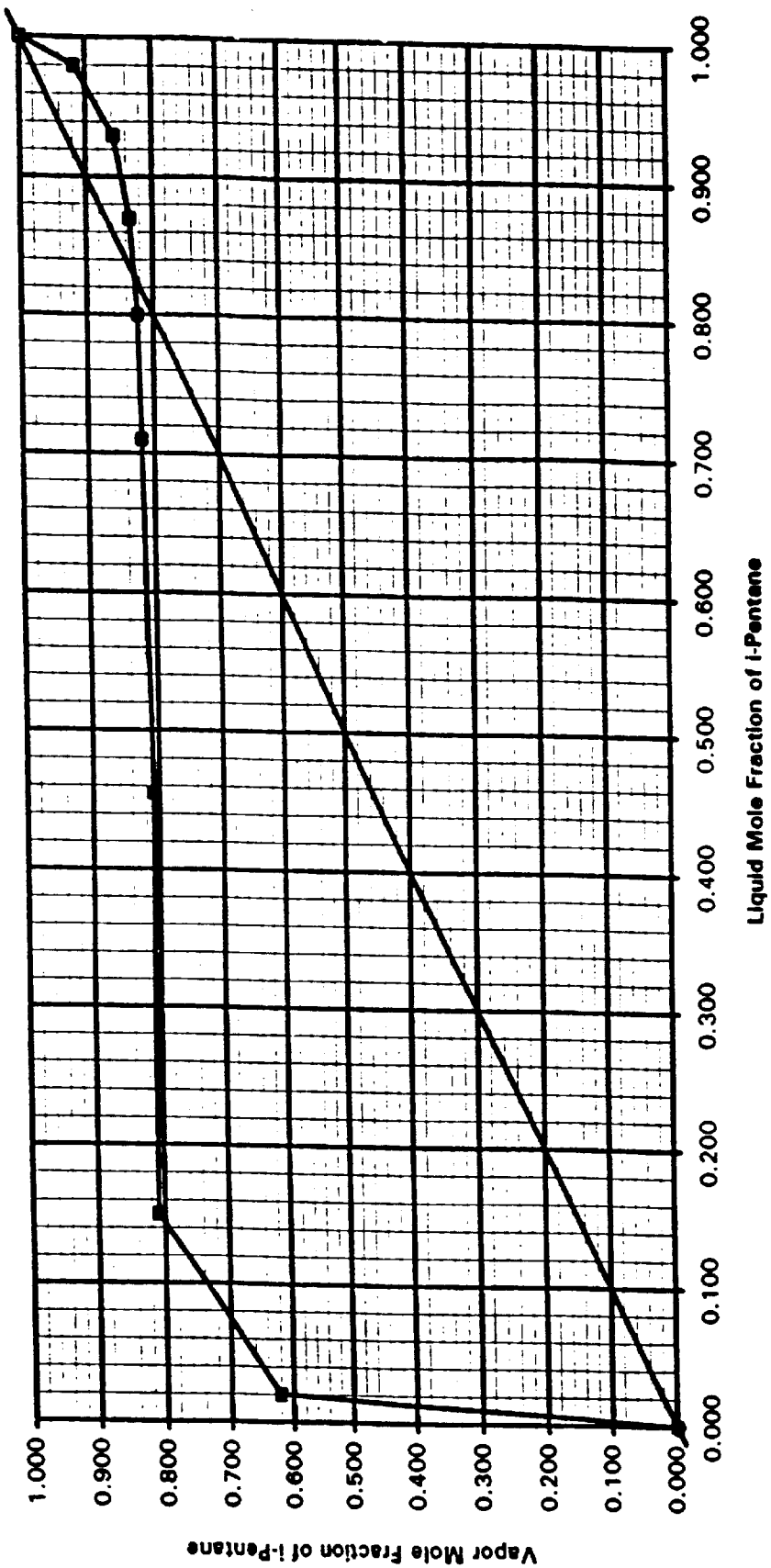
FIG. 1 is a graph showing a plot of the mole fraction of 2-methyl butane in the vapor phase versus the mole fraction of 2-methyl butane in the liquid phase of varying mixtures of 2-methyl butane and perluorohexane refluxing at steady state at one atmosphere.

The present invention relates to an azeotropic composition which is particularly useful for the production of rigid foams. This azeotropic composition may also be used for solvent cleaning applications. More particularly, the present invention is directed to an azeotrope-like composition which consists essentially of (a) from about 26% to about 72% by weight of perfluorohexane (based on the total weight of the azeotropic composition) and (b) one compound selected from (1) about 36 to about 74% by weight 2-methyl butane (based on the total weight of the azeotropic composition) or (2) about 28 to about 53% by weight n-pentane (based on the total weight of the azeotropic composition). The sum of the weight percent of (a) plus the weight percent of (b) is approximately 100 weight percent.

The compounds which are essential to the compositions of the present invention are perfluorohexane (boiling point= 59° C.), 2-methyl butane (boiling point=28.0° C.), and n-pentane (boiling point=35.5° C.). All of these compounds are known to those in the art and are commercially available. These compounds may be used in the compositions of the present invention at their normal commercial purity (i.e., at least 95%).

Any of the compositions made up of (a) from about 26 to about 72% by weight perfluorohexane and (b) only one compound selected from (1) about 36 to about 74% by weight 2-methyl butane or (2) about 28 to about 53% by weight n-pentane in which the sum of the weight percent of (a) plus the weight percent of (b) is approximately 100 weight percent is azeotropic in nature in that compositions within these ranges exhibit a substantially constant boiling point. Because they have such a substantially constant boiling point, the mixture does not tend to fractionate to any great extent upon evaporation. After evaporation, only a small difference exists between the composition of the vapor phase and the initial liquid phase. This difference is so small that the compositions of the vapor and liquid phases are considered to be substantially identical. Therefore, any mixture within the above-noted ranges exhibits properties which are characteristic of a true binary azeotrope.

Azeotropic compositions consisting essentially of (a) from about 40 to about 68% by weight perfluorohexane and only one compound selected from (1) about 43 to about 60% by weight 2-methyl butane or (2) about 32 to about 44% n-pentane in which the sum of the weight percent of (a) plus the weight percent of (b) is approximately 100 are preferred azeotropic compositions.

More specifically, the azeotropic compositions made up of perfluorohexane and 2-methyl butane consist essentially of from about 26 to about 64% (preferably from about 40 to about 57%) by weight perfluorohexane and from about 36 to about 74% (preferably from about 43 to about 60%) by weight 2-methyl butane. The composition consisting essentially of about 49% by weight perfluorohexane and about 51% by weight 2-methyl butane has been established, within the accuracy of the calibration procedure described below, as the true binary azeotrope with a boiling point of 25.0° C.

The azeotropic compositions made up of perfluorohexane and n-pentane consist essentially of from about 47 to about 72% (preferably from about 56 to about 68%) by weight perfluorohexane and from about 28 to about 53% (preferably from about 32 to about 44%) by weight n-pentane. The composition consisting essentially of about 62% by weight perfluorohexane and about 38% by weight n-pentane has been established, within the accuracy of the calibration procedure described below, as the true binary azeotrope with a boiling point of 30.3° C.

FIG. 1 shows a graph on which the mole fraction of 2-methyl butane in the vapor phase is plotted against the mole fraction of 2-methyl butane in the liquid phase of varying mixtures of 2-methyl butane and perfluorohexane refluxing at steady state and at 1 atmosphere. These mole fractions were obtained by gas chromatography and were adjusted to be quantitative by using a calibration curve as is described more fully below. The point at which the mole fraction curve crosses the line with a slope of 1 and intercept 0 is, by definition, the true binary azeotropic composition.

The calibration curve used to calibrate the gas chromatographic results was generated as follows. A series of blends of 2-methyl butane and perfluorohexane were prepared with from 0 to 100 mole percent of 2-methyl butane in 10% increments. The mole percent of perfluorohexane in each blend was the difference between 100 mole percent and the mole percent of 2-methyl butane. First, each blend was injected into a Gas Chromatograph ("GC") to establish a correlation between relative peak areas versus actual molar concentrations. This was done by making duplicate samples of each blend and measuring each of the samples twice. This data was used to establish the calibration curve and a 95% confidence interval which was used to establish the range of error for the azeotropic compositions.

The relative molar amounts of perfluorohexane and 2-methyl butane necessary to form an azeotropic composition were then determined by a two step process. In the first step, 2-methyl butane was charged to a reactor.

Subsequently, perfluorohexane was added to the reactor in increments indicated by the datapoints in the graphs. After each addition of perfluorohexane, the contents of the reactor were allowed to reflux for 10–15 minutes with the reflux condenser at 0° C. and open to the atmosphere through a drying tube. After steady state was achieved, samples of the liquid and vapor were taken through sample ports. The temperature of the liquid in the reactor was measured and the vapor temperature was measured at a point between the reactor and the condenser. Duplicate samples were injected into the GC and the relative peak areas were recorded. These relative peak areas were converted to mole fractions by using the calibration curve.

In the second step, perfluorohexane was charged to a reactor. Subsequently, 2-methyl butane was added in increments indicated by the datapoints in the graphs. The contents of the reactor were then heated and samples were taken and analyzed in the same manner described above in the first step. The data was plotted with the resultant graph being shown in FIG. 1.

Figure 2:
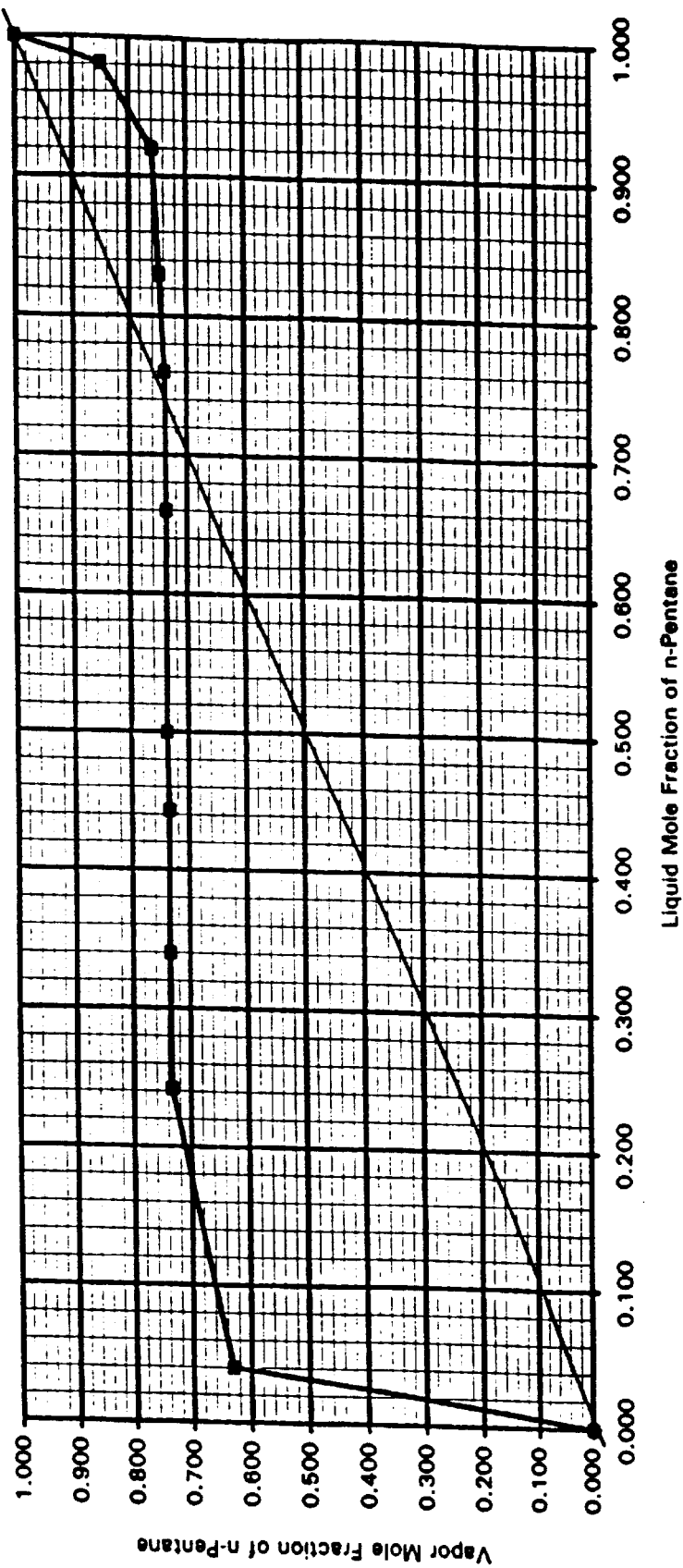
FIG. 2 is a graph showing a plot of the mole fraction of n-pentane in the vapor phase versus the mole fraction of n-pentane in the liquid phase of varying mixtures of n-pentane and perfluorohexane refluxing at steady state at one atmosphere.

The graph shown in FIG. 2 was generated in the same manner as FIG. 1 using blends of perfluorohexane and n-pentane.

An azeotrope is defined as a mixture of liquids where, at the boiling point, the concentration of the components is the same in the liquid and vapor phases. The point at which the mole fraction plot crosses the line having a slope of 1 and an intercept of 0 is the expected azeotropic composition.

The azeotropic compositions of the present invention are particularly useful as chlorine-free blowing agents for the production of rigid foams. The amount of azeotropic composition used depends on the desired foam density and the presence of additional blowing agents (the water) and has to be adjusted according to methods known to those skilled in the art. Typically, these compositions are generally included in the foam-forming mixture in an amount of from about 2% to about 20% preferably from about 3% to about 12%. The ability of these azeotropic compositions to act as a blowing agent is particularly surprising in view of the fact that pure perfluorohexane does not produce a useful foam under the conditions used in the Examples which follow.

Foams may be produced with the azeotropic compositions of the present invention by reacting a) an isocyanate-reactive material with b) an organic polyisocyanate in the presence of one of the azeotropic compositions of the present invention, optionally in the presence of a catalyst or other additives, auxiliary agents and processing aids.

Any of the known isocyanate-reactive materials, organic polyisocyanates, catalysts and foam stabilizers may be used to produce foams with the azeotropic compositions of the present invention.

The known isocyanates which are useful in the practice of the present invention include polyisocyanates, modified polyisocyanates and isocyanate-terminated prepolymers. Suitable polyisocyanates which may be used to produce foams in accordance with the present invention include aromatic, aliphatic, cycloaliphatic polyisocyanates and combinations thereof. Specific examples of such isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenylisocyanates.

Crude polyisocyanates may also be used in the practice of the present invention. The crude toluene diisocyanate obtained by phosgenating a mixture of toluene diamines and the crude diphenylmethane diisocyanate obtained by phosgenating crude diphenylmethane-diamine are examples of suitable crude polyisocyanates. Suitable undistilled or crude polyisocyanates are disclosed in U.S. Pat. No. 3,215,652.

Suitable modified polyisocyanates may be obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing isocyanate groups and having an isocyanate group content of from about 25 to about 35% by weight, preferably from about 27 to about 33% by weight, most preferably 28 to 32% by weight, particularly those based on polyether polyols or polyester polyols and diphenylmethane diisocyanate. Processes for producing these modified polyisocyanates are known in the art.

The polyisocyanate, modified polyisocyanate or isocyanate-terminated prepolymer may be reacted with any of the polyols or polyamines which are known to be useful in the production of polyurethane/polyurea foams. Suitable polyols include polyether polyols, polyester polyols, polyhydroxy polyacetals, polyhydroxy polycarbonates, polyhydroxy polyacrylates, polyester ethers, polyhydroxy polythioethers, polyhydroxy polyester amides, polybutadienes and polylactones having a molecular weight of from about 400 to about 10,000 and a functionality of at least about two, preferably from about 2 to about 4. Polyester and polyether polyols are preferred.

Suitable polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalates. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis (hydroxymethyl)cyclohexane); 2-methyl-1,3-propanediol; 2,2,4-trimethyl-1,3-pentanediol; triethylene glycol; tetraethylene glycol; polyethylene glycol; dipropylene glycol; polypropy-lene glycol; dibutylene glycol and polybutylene glycol, glycerine and trimethylolpropane. The polyesters may also contain a portion of carboxyl end groups. Polyesters of lactones, e.g. ε-capro-lactone or hydroxyl carboxylic acids such as ω-hydroxycaproic acid, may also be used.

Suitable polycarbonates containing hydroxyl groups include those obtained by reacting diols with phosgene, a diarlycarbonate (e.g., diphenyl carbonate) or cyclic carbonates (e.g., ethylene or propylene carbonate). Examples of suitable diols include: 1,3-propanediol; 1,4-butanediol; 1,6-hexanediol; diethylene glycol; triethylene glycol; and tetraethylene glycol. Polyester carbonates obtained by reacting polyesters or polylactones (such as those described above) with phosgene, diaryl carbonates or cyclic carbonates may also be used in the practice of the present invention.

Polyether polyols which are suitable for producing foams in accordance with the present invention include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers which do not contain more than about 10% by weight of ethylene oxide units are preferred. Polyethers obtained without the addition of ethylene oxide are most preferred. Suitable starting compounds containing reactive hydrogen atoms include polyhydric alcohols (described above as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2tris-(hydroxylphenyl)ethane.

Polyethers modified by vinyl polymers are also suitable for producing foams in accordance with the present invention. Such modified polyethers may be obtained, for example, by polymerizing styrene and acrylonitrile in the presence of a polyether (U.S. Pat. Nos. 3,383,351; 3,304, 273; 3,523,095; 3,110,695 and German Patent No. 1,152, 536).

The polythioethers useful in the production of foams in accordance with the present invention include the condensation products obtained from thiodiglycol on its own and/or with other glycols, dicarboxylic acids, formaldehyde, aminocarboxylic acids or amino alcohols. These condensation products may be polythio-mixed ethers, polythioether esters or polythioether ester amides, depending on the co-components.

Amine-terminated polyethers may also be used to produce foams in accordance with the present invention. Suitable amine-terminated polyethers may be prepared by reacting a primary amine with a polyether containing terminal leaving group such as halides, or mesylates as disclosed in commonly assigned U.S. patent application Ser. No. 07/957,929, filed on Oct. 7, 1992, or as disclosed in U.S. Pat. Nos. 3,666,726, 3,691,112 and 5,066,824.

Suitable polyacetals include those prepared from aldehydes (e.g., formaldehyde) and glycols such as diethylene glycol, triethylene glycol, ethoxylated 4,4'-dihydroxydiphenyldimethylmethane, and 1,6-hexanediol. Polyacetals prepared by the polymerization of cyclic acetals may also be used in the practice of the present invention.

Polyhydroxy polyester amides and polyamines useful in the production of foams with the blowing agents of the present invention include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

Low molecular weight, isocyanate-reactive compounds useful in producing foams in accordance with the present invention have from 2 to 8 hydroxyl groups, preferably 2 to 4 and most preferably two hydroxyl groups, and have an average molecular weight of from about 34 to about 399, preferably from about 60 to about 200, most preferably from about 100 to about 150 and may be used in combination with or instead of the high molecular weight material containing two or more hydroxyl groups. Useful low molecular weight isocyanate-reactive materials include the polyhydric alcohols which have previously been described in the process for the preparation of the polyester polyols and polyether polyols. Dihydric alcohols are preferred. The weight ratio of the low molecular weight to the high molecular weight material containing two or more hydroxyl groups is not critical to the invention. Ratios of from about 1:100 to about 1:10, preferably from about 2:100 to about 5:100, have been found to be useful.

In addition to the above-mentioned isocyanate-reactive compounds, monofunctional and even small amounts of trifunctional and higher functional compounds generally known in polyurethane chemistry may be used to produce foams in accordance with the present invention. For example, trimethylolpropane may be used in special cases in which slight branching is desired.

Catalysts may be used to aid the reaction. Examples of catalysts useful for promoting urethane reactions include di-n-butyl tin dichloride, di-n-butyl tin diacetate, di-n-butyl tin dilaurate, triethylenediamine, or bismuth nitrate.

Any of the known blowing agents, catalysts, chain extenders, crosslinking agents, auxiliaries and additives may also be included in the foam-forming mixture.

Optional additives and auxiliaries which may be useful in the foam-forming compositions of the present invention include: cell openers such as polyether polyols based on sorbitol, surfactants, particularly silicone surfactants, crosslinking agents such as aliphatic amines and aromatic amines and flame retardants.

Any of the known methods for producing polyurethane foams may be used in the practice of the present invention. Suitable methods include reaction of the various reactants using the known one-shot process, prepolymer process or semi-prepolymer process.

Having thus described our invention, the following Examples are given as being illustrative thereof. All parts and percentages given in these Examples are parts by weight or percentages by weight, unless otherwise indicated.

EXAMPLES

The following materials were used in the Examples:

| | |
|---|---|
| POLYOL A: | A 630 OH number polyol prepared by reacting 1 mole of ethylene diamine with 5 moles of propylene oxide. |
| POLYOL B: | A 250 OH number polyol prepared by reacting 1 mole of glycerin with approximately 3.3 moles of propylene oxide. |
| PFH: | perfluorohexane. |
| 2-MeB: | 2-methyl butane. |
| n-P: | n-pentane. |

-continued

| | |
|---|---|
| Tegostab B-8426: | A polysiloxane polyether copolymer which is commercially available from Goldschmidt Chemical Corporation. |
| DMCHA: | dimethylcyclohexylamine. |
| ISO: | The polymethylene polyphenyl polyisocyanate prepolymer having an NCO content of approximately 27% which is commercially available from Miles Inc. under the name Mondur E-577. |

Example 1

7.59 parts PFH and 7.89 parts 2-MeB were first mixed. This azeotropic mixture was then blended with the other components listed in TABLE 1 under B-SIDE. (The materials and the amount of each of those materials included in the B-SIDE are given in TABLE 1.) The amount of ISO indicated in TABLE 1 was then mixed with the B-SIDE in a mixing vessel using an air driven stirrer. After 5 seconds of mixing, the reaction mixture was poured into an aluminum mold heated to 40° C., which mold measured 14"×14"×3". The reactivity time, density and K-factor of the foam produced were determined. The results of these determinations are reported in TABLE 1.

Example 2

The procedure of Example 1 was repeated using the same materials with the exception that a different azeotrope was used. The azeotrope used in this Example was made with 11.89 parts PFH and 7.29 parts n-P. The amounts of the specific materials used and the characteristics of the product foam are reported in TABLE 1.

Example 3
(Comparative)

The procedure of Example 1 was repeated using the same materials with the exception that 61.07 parts by weight of PFH alone (rather than an azeotrope) was used as the blowing agent. The specific materials, and the amount of each material are all reported in TABLE 1.

The resulting foam showed an irregular cell structure and large voids and was not useful. No foam properties could be reported.

TABLE 1

| Example | 1 | 2 | 3 |
|---|---|---|---|
| B-SIDE | | | |
| POLYOL A (pbw) | 35.89 | 35.89 | 35.89 |
| POLYOL B (pbw) | 35.89 | 35.89 | 35.89 |
| Tegostab B-8426 (pbw) | 1.59 | 1.59 | 1.59 |
| Water (pbw) | 1.59 | 1.59 | 1.59 |
| DMCHA (pbw) | 2.62 | 2.62 | 2.62 |
| PFH (pbw) | 7.59 | 11.89 | 61.07 |
| 2-MeB (pbw) | 7.89 | — | — |
| n-P (pbw) | — | 7.29 | — |
| A-SIDE | | | |
| ISO (pbw) | 117.28 | 117.28 | 117.28 |
| RESULTS | | | |
| Mix Time (sec) | 5 | 5 | 5 |
| Cream Time (sec) | <10 | <10 | <10 |
| Gel Time (sec) | 38 | 37 | — |
| Density (lb/ft$^3$) | 1.87 | 1.83 | — |
| K-factor (BTU-in./° F. hr.ft.$^2$) | 0.151 | 0.199 | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An azeotropic composition which is made up of about 49% by weight perfluorohexane and about 51% by weight 2-methyl butane.

* * * * *